(12) United States Patent
Nakaya (10) Patent No.: US 8,186,734 B2
(45) Date of Patent: May 29, 2012

(54) DOOR OPENING AND CLOSING DEVICE

(75) Inventor: Hiroyuki Nakaya, Utsunomiya (JP)

(73) Assignee: Nifco Inc., Yokohama (JP)

( * ) Notice: Subject to any disclaimer, the term of this patent is extended or adjusted under 35 U.S.C. 154(b) by 56 days.

(21) Appl. No.: 12/805,485

(22) Filed: Aug. 3, 2010

(65) Prior Publication Data

US 2011/0000135 A1 Jan. 6, 2011

Related U.S. Application Data

(63) Continuation of application No. 11/473,085, filed on Jun. 23, 2006, now Pat. No. 7,766,407.

(30) Foreign Application Priority Data

Jun. 24, 2005 (JP) ................................. 2005-184710

(51) Int. Cl.
*B60R 13/00* (2006.01)
(52) U.S. Cl. ..................................... 296/24.34; 296/24.3
(58) Field of Classification Search ................ 296/24.3, 296/24.34; 292/333, 334, DIG. 4
See application file for complete search history.

(56) References Cited

U.S. PATENT DOCUMENTS

| | | | | |
|---|---|---|---|---|
| 5,520,313 A | * | 5/1996 | Toshihide | 224/539 |
| 5,893,478 A | * | 4/1999 | Maruoka | 220/827 |
| 6,802,550 B1 | * | 10/2004 | Griggs et al. | 296/24.34 |
| 7,063,225 B2 | * | 6/2006 | Fukuo | 220/264 |
| 7,234,746 B2 | * | 6/2007 | Sakakibara et al. | 296/24.34 |
| 7,451,888 B2 | * | 11/2008 | Tanaka | 220/263 |
| 2003/0071047 A1 | * | 4/2003 | Harada | 220/835 |
| 2004/0201238 A1 | * | 10/2004 | Griggs et al. | 296/24.34 |
| 2005/0133523 A1 | * | 6/2005 | Kim | 220/827 |
| 2009/0066102 A1 | * | 3/2009 | Shiono et al. | 296/24.34 |

* cited by examiner

*Primary Examiner* — Jerry Redman
(74) *Attorney, Agent, or Firm* — Manabu Kanesaka (57) ABSTRACT

A door opening and closing device has a rotational mechanism configured to switch a door between a closed position and an open position relative to a base member. The door opening and closing device includes a latch mechanism for latching the door in the closed position on the base member. The latch mechanism includes a latch device attached to the base member, a case disposed above the latch device, a slider slidably situated in the case above the latch device, and a latching member pivotally supported by the case and including a base end slidably connected with the slider and a tip configured to engage a portion of the door. When the door is moved to the closed position, the slider is moved by the door and is engaged with the latch device while the latching member is pivoted to engage the door.

5 Claims, 10 Drawing Sheets

DOOR OPENING AND CLOSING DEVICE

CROSS-REFERENCE TO RELATED APPLICATION

This is a continuation application of Ser. No. 11/473,085 filed on Jun. 23, 2006, now U.S. Pat. No. 7,766,407 issued on Aug. 3, 2010.

BACKGROUND OF THE INVENTION AND RELATED ART STATEMENT

The present invention relates to a door opening and closing device which opens and closes a door relative to a base member through a rotational mechanism and latch mechanism.

In this specification, it should be noted that the term "base member" is intended to include various types of housing main members, housing and the like. It should also be noted that the term "door" is intended to include a lid, blocking plate or the like. Additionally, it should be noted that the term "latch mechanism" has substantively the same meaning as a lock mechanism.

Figure 10A:
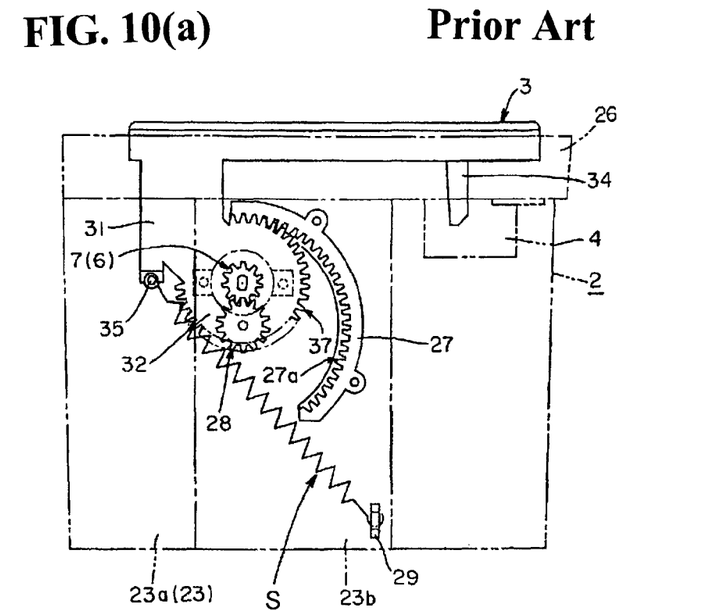
FIGS. 10(a), 10(b) are explanatory drawings showing the door opening and closing device disclosed above in connection with Japanese Patent Publication No. 2003-129742.
Figure 10B:
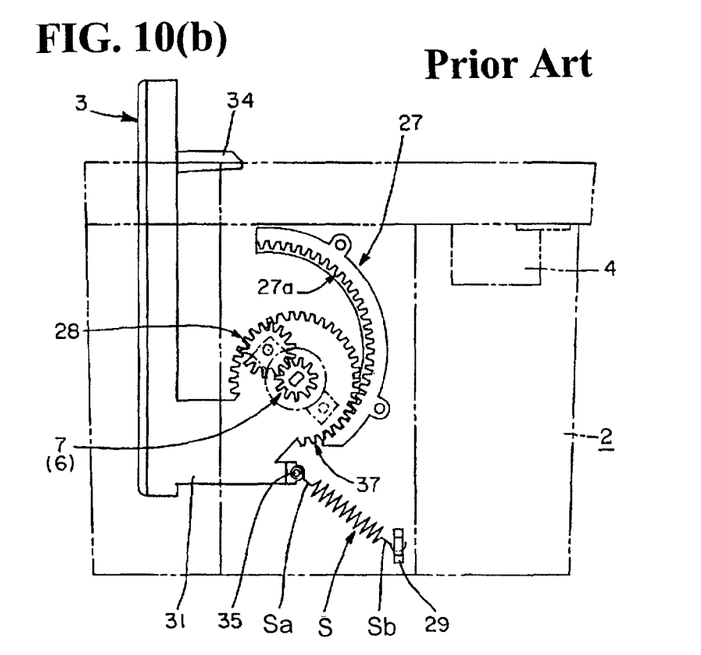

FIGS. 10(a), 10(b) show a door opening and closing device disclosed in Japanese Patent Publication No. 2003-129742. FIG. 10(a) shows a closed position of the door while FIG. 10(b) shows an open position of the door.

In this door opening and closing device, a door 3 is switched from a closed position to an open position relative to a base member 2 through a rotational mechanism, and releasably locked through a latch mechanism in the closed position. In this arrangement, the upper side of the base member 2 is bordered by a flange portion 26. The side walls 23 of the base member 2 are such that back sides 23b overhang the exterior to a greater extent than the front sides 23a, and window portions are formed through the projecting end faces. The door 3 includes supporting arms 31 which extend out through the window portions from the inside of the base member 2. The rotational mechanism is such that arc-like gear portions 37 are provided in the arms 31 of the door 3, while a rotating gear 7 is provided at the center of the arc of the gear portions 37. The base member 2 includes internally-toothed gear portions 27a provided in arcuate ribs 27 which engage the gear portions 37; and second fixing gear portions 28 provided inside the first fixing gears 27a and engaging the rotating gear 7.

The rotating gear 7 is mounted on an output shaft of a damper means 6. Also, a latch mechanism 4 is, for example, a "push-push" locking mechanism (which may also be referred to as a push-to-open mechanism or push-to-lock/push-to-open mechanism) attached to the base member 2.

When the door 3 is pivoted from its, open position to its closed position against an urging force of an urging or biasing means S, the latch mechanism 4 locks by engaging an engagement member 34 additionally provided in the door 3, and unlocks by pushing the door 3 further in the closing direction. In this particular arrangement, the urging means 5 is a coil spring member. One end Sa of the urging means S is connected to a projection 29 provided on the base member while the another end Sb of the urging means S is connected to shaft portions 35 provided on an arm 31 of the lid or door 3.

In the door opening and closing device of the above-mentioned Japanese Patent Publication No. 2003-129742, the door 3 is open and closed via movement along the track of the inner periphery (first fixing gear portions 27a) of each arched rib 27 of the rotational mechanism. More specifically, when the door 3 is rotated from the closed position to the open position, or from the open position to the closed position, the rotational fulcrum of the door 3 is moved downward or upward according to the first fixing gear portion 27a of the arched rib 27.

With this arrangement, the rotational mechanism can control the volume of an overhung portion from the inside of the base member 2 of the door 3 in the open position, and provide an excellent operation due to the engagement of the gears with the braking of the damper means 6. However, in this rotational mechanism, each arc-like gear portion 37 on an arm is engaged with the first fixing gear portion 27a on an arched rib which is concentric with the second fixing gear portion 28. With this the opening and closing track of the door cannot be freely determined, and also the necessarily precise relationship between the gears is hard to obtain. If this precise relationship between the gears cannot be obtained, a reliable operation cannot be provided.

Also, the first fixing gear portion 27a provides the arched rib 27 on each side of the base member 2, a tooth form or rack is formed on the inner periphery face of the arched rib 27, and the second fixing gear portion 28 comprises a rotatable spur gear. As a result, when the first fixing gear portion 27a or the second fixing gear portion 28 is integrally molded with the base member 2, the molding becomes complicated and expensive, and as a result the precision necessary in the engagement between the gears is hard to maintain.

Another problem resides in that, when the door receives a large load downward in the closed position, the second fixing gear portion 28 bears an excessive load and this may cause damage. Obviously, as a device, the volume of the overhung portion from the inside of the base member 2 of the door 3 in the open position is preferably reduced. On the other hand, the latch mechanism is such that the door 3 includes the engagement member 34 which projects away from the inner face on the free edge of the door, and is engaged and disengaged through the engagement member 34. Accordingly, when the door is open, the engagement member 34 projects into the opening and as a result, the appearance is deteriorated, and also the engagement member 34 can interfere with articles which are removed from or placed into the base member 2.

Objects of the present invention are to solve the above-mentioned problems, and provide a rotational mechanism which facilitates integral molding with the base member while maintaining dimensional precision, and allows the volume of the overhung portion from the inside of the base member of the door to be reduced when the door is open, especially by simplifying the mechanical structure. Especially, in the structure wherein the latch mechanism is additionally provided on the base member side, the latch mechanism can eliminate the use of a conventional engagement member which projecting from the door, i.e., the latch mechanism can adopt a difference in level configuration such as a depression or L shape or the like, the appearance of which can be easily maintained and the engagement member can be eliminated, so that the overall appearance of the latch mechanism can be improved.

Further objects and advantages of the invention will be apparent from the following description of the invention.

SUMMARY OF INVENTION

In accordance with a first aspect of the invention, a door opening and closing device can switch a door between a closed position and open position relative to a base member through a rotational mechanism, and can releasably lock the door in a closed position through a latch mechanism provided on a base member. In the rotational mechanism, the door includes a supporting arm; an arc-like or sector gear portion provided in the arm; and a rotating gear additionally provided at approximately the center of the arc of the gear portion. Also, the base member includes a first rack portion engaging the arc-like gear portion and a second rack portion engaging the rotating gear. In this instance, the first rack portion and second rack portion are essentially parallel to each other and separated by a predetermined distance. The door is switched between the open position and closed position by the sector gear and the rotating gear respectively traversing the first and second rack portions.

In the above-mentioned door opening and closing device, the following is considered advantageous. The first rack portion and second rack portion extend in a vertical direction corresponding to the depth dimension of the interior of the base member, or a fore and aft direction relative to a horizontally arranged base member (aspect 2). Both the first rack portion and second rack portion are straight (aspect 3). The rotating gear is mounted in an output shaft of a rotary-type damper means assembled with the arm (aspect 4).

In accordance with the fifth aspect the door opening and closing device of the invention, the door is switched between the closed position and open position relative to the base member through the rotational mechanism, and locked to be unlockable in the closed position through the latch mechanism provided in the base member. The latch mechanism includes a slider provided above the latch device among the above-mentioned arranged portions to be slidable; and a latching member whose base end fits into the slider to be freely movable in a state wherein the latching member is pivoted on the arranged portions and whose tip is engaged and disengaged from the corresponding portion of the door, with a latch device assembled with the arranged portions on the base member. When the door is rotated from the open position to the closed position, the slider is slid by a pressing force received from the door. With this, the slider can be locked in the latch device, and at the same time, the tip of the latching member can be rotated to locked in the corresponding portion of the door.

Advantageously, the door opening and closing device comprises a push-push locking mechanism which unlocks locking by an additional pushing operation to the closed position of the door from a state wherein the door is urged to the open position by an urging means, and also the latch device locks the tip of the latching member in the corresponding portion of the door (aspect 6). Also, the arranged portion is constituted by a case opening up and down or back and forth, the slider and latching member are arranged on the upper side of the case, and the latch device is arranged on the underside of the case (aspect 7).

The door opening and closing mechanism of the present invention includes the following effect.

The first aspect of the invention is such that the rotational mechanism of the door opening and closing device, for example, compared to a conventional mechanism of the Japanese Patent Publication No. 2003-129742, the first rack portion and the second rack portion maintain a predetermined distance, so that the possibility of the design of an opening and closing track of the door can be greatly expanded.

Figure 1:
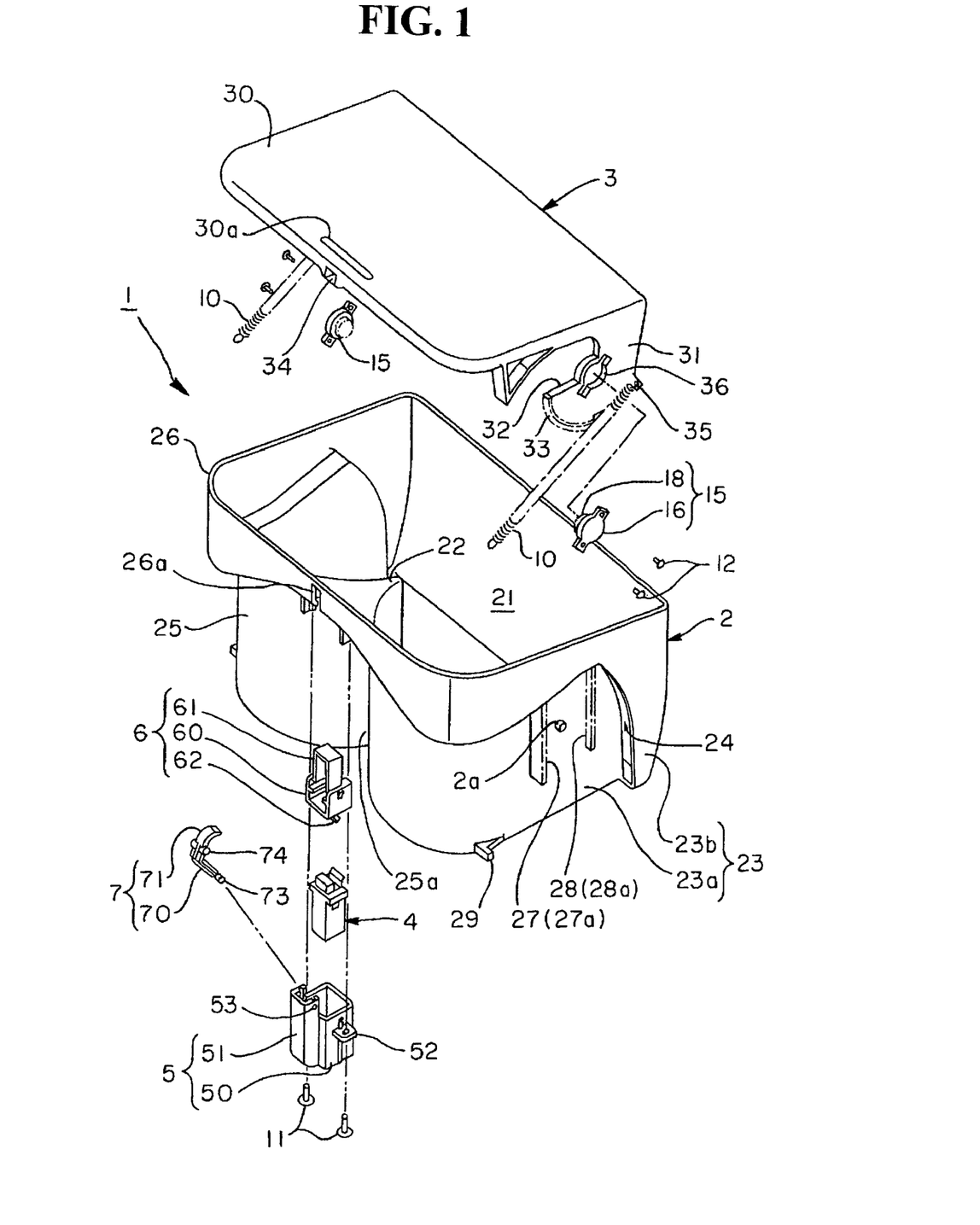
FIG. 1 is an exploded perspective structural view showing a box provided with a door opening and closing device according to an embodiment of the invention.
Figure 2:
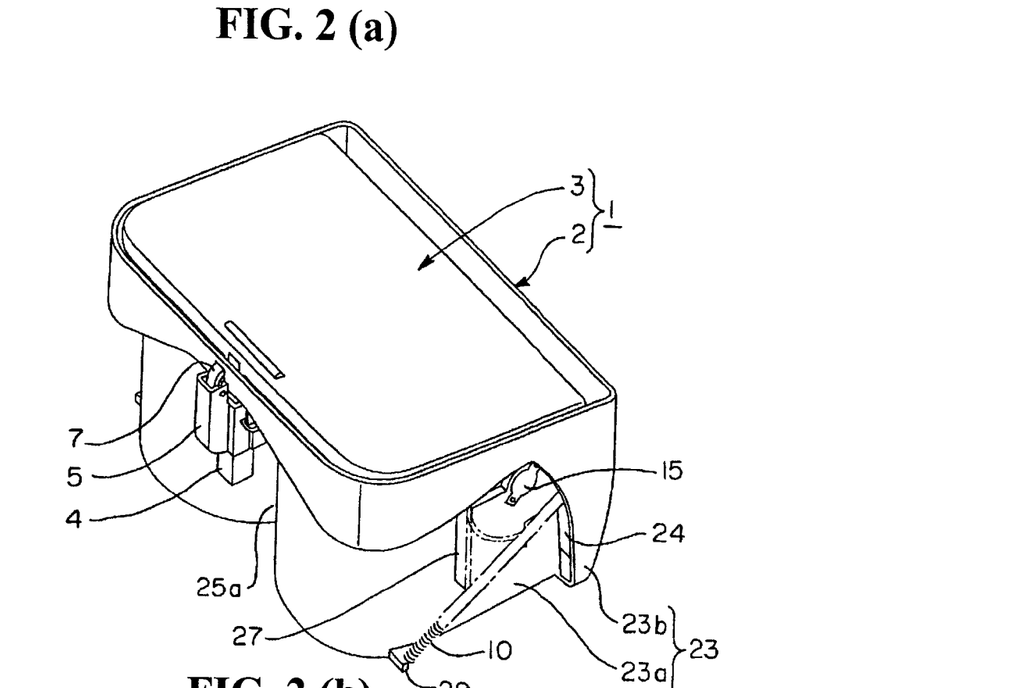
FIG. 2(a) is a perspective view showing a closed position of a door of a box in FIG. 1.
FIG. 2(b) is a perspective view showing an open position of the door of the box in FIG. 1.
Figure 3:
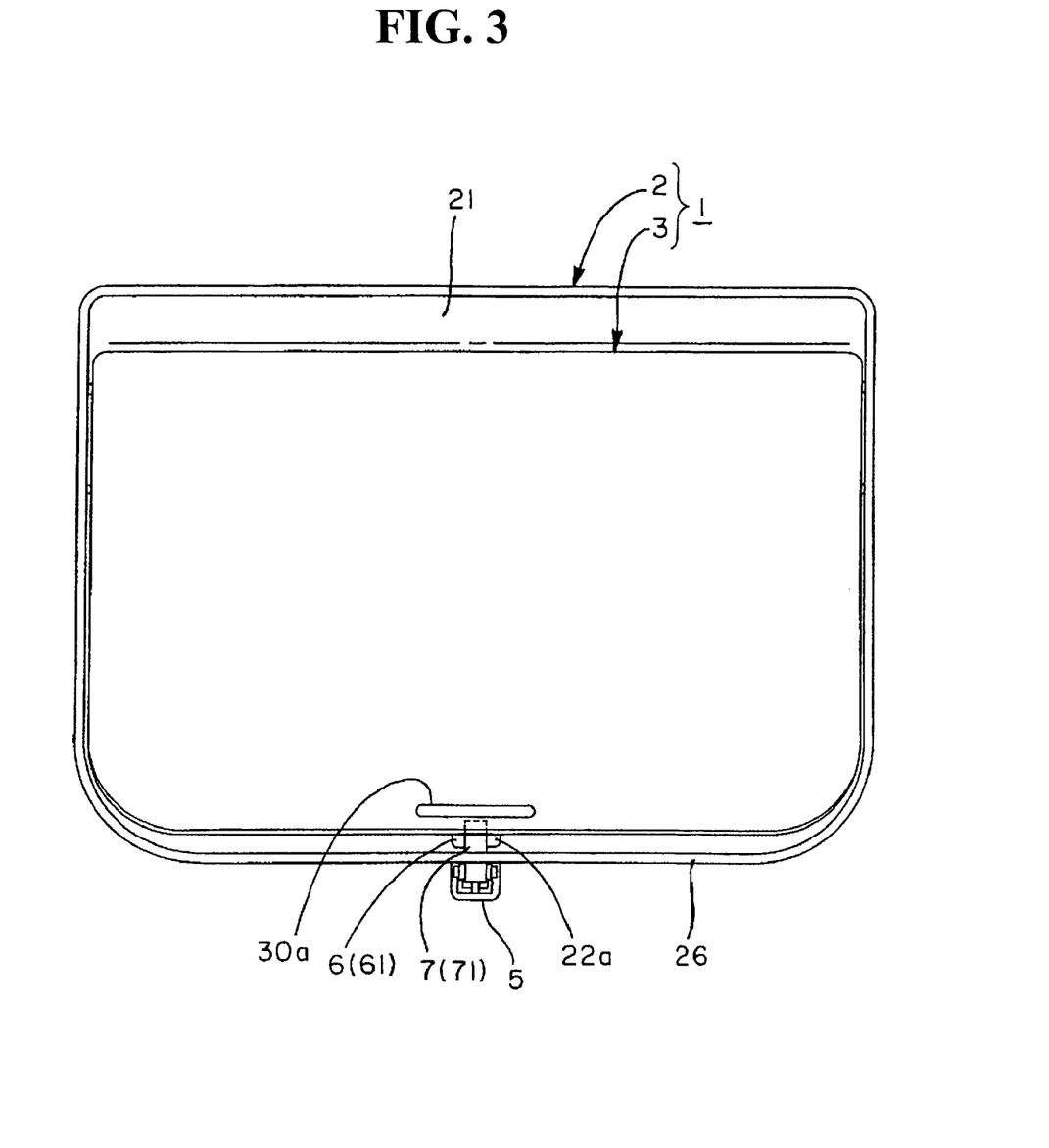
FIG. 3 is a top view showing the box with the door in the closed position.
Figure 4:
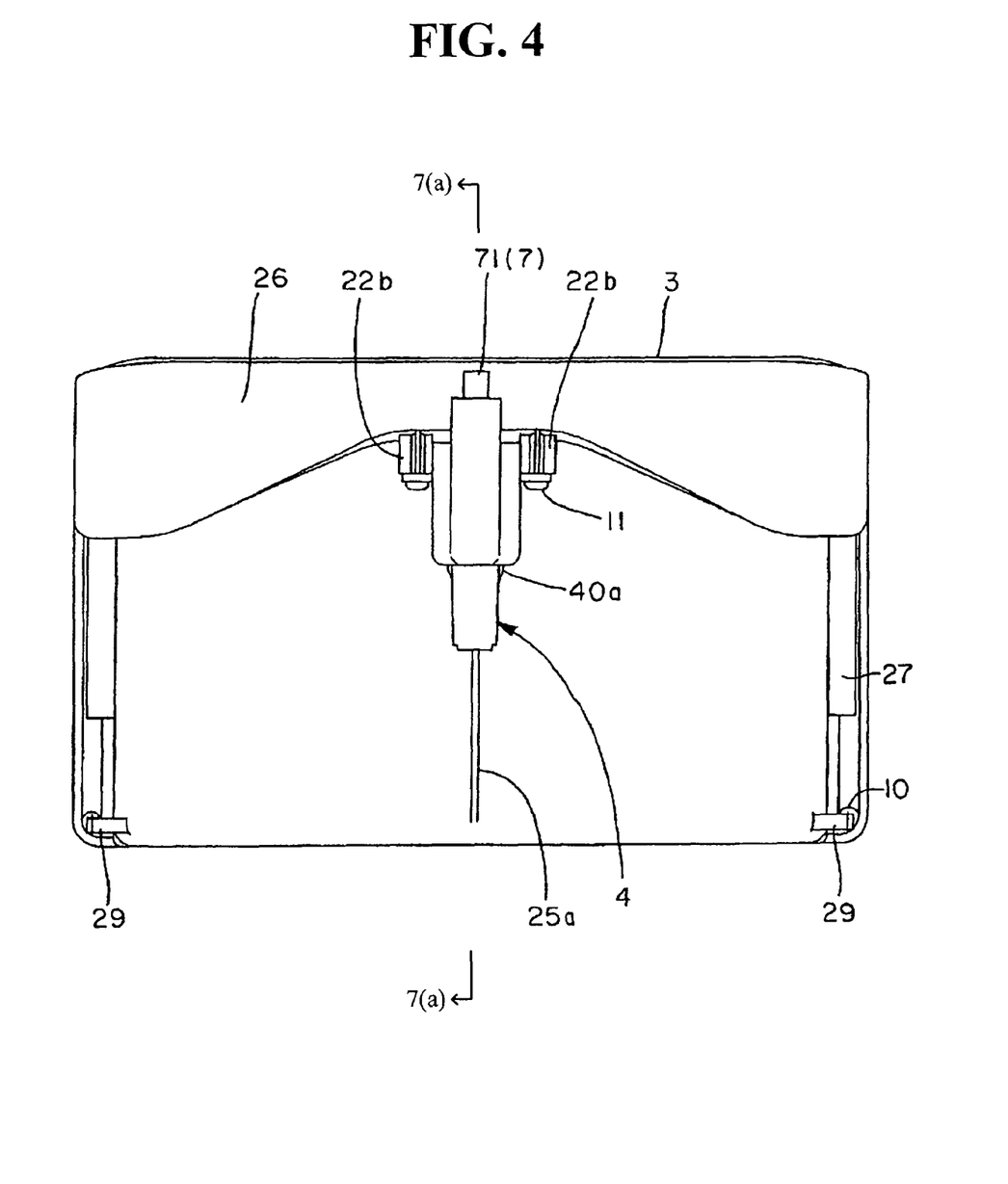
FIG. 4 is a front view showing the box in the closed position of the door.
Figure 5:
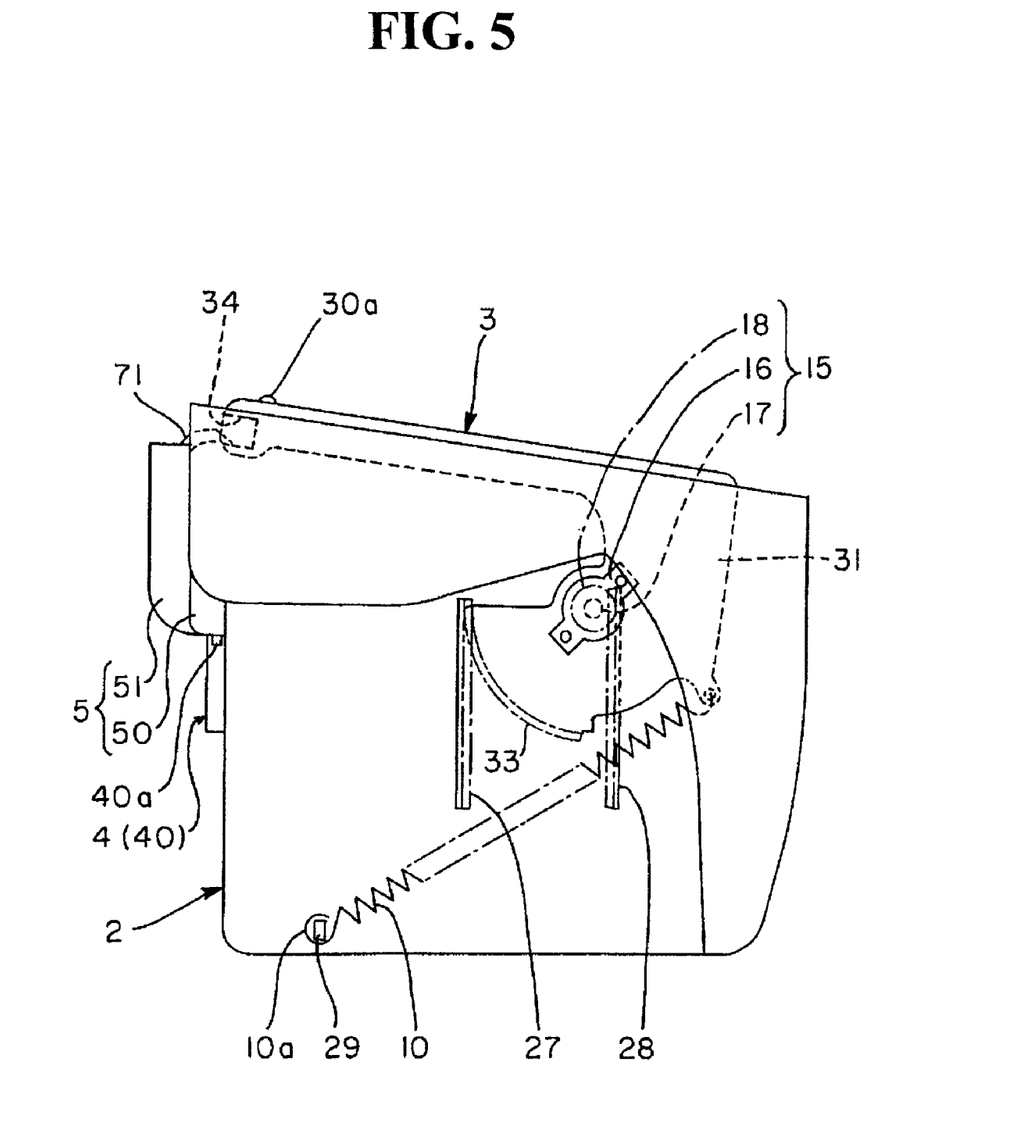
FIG. 5 is a side view showing the box with the door in the closed position.
Figure 6:
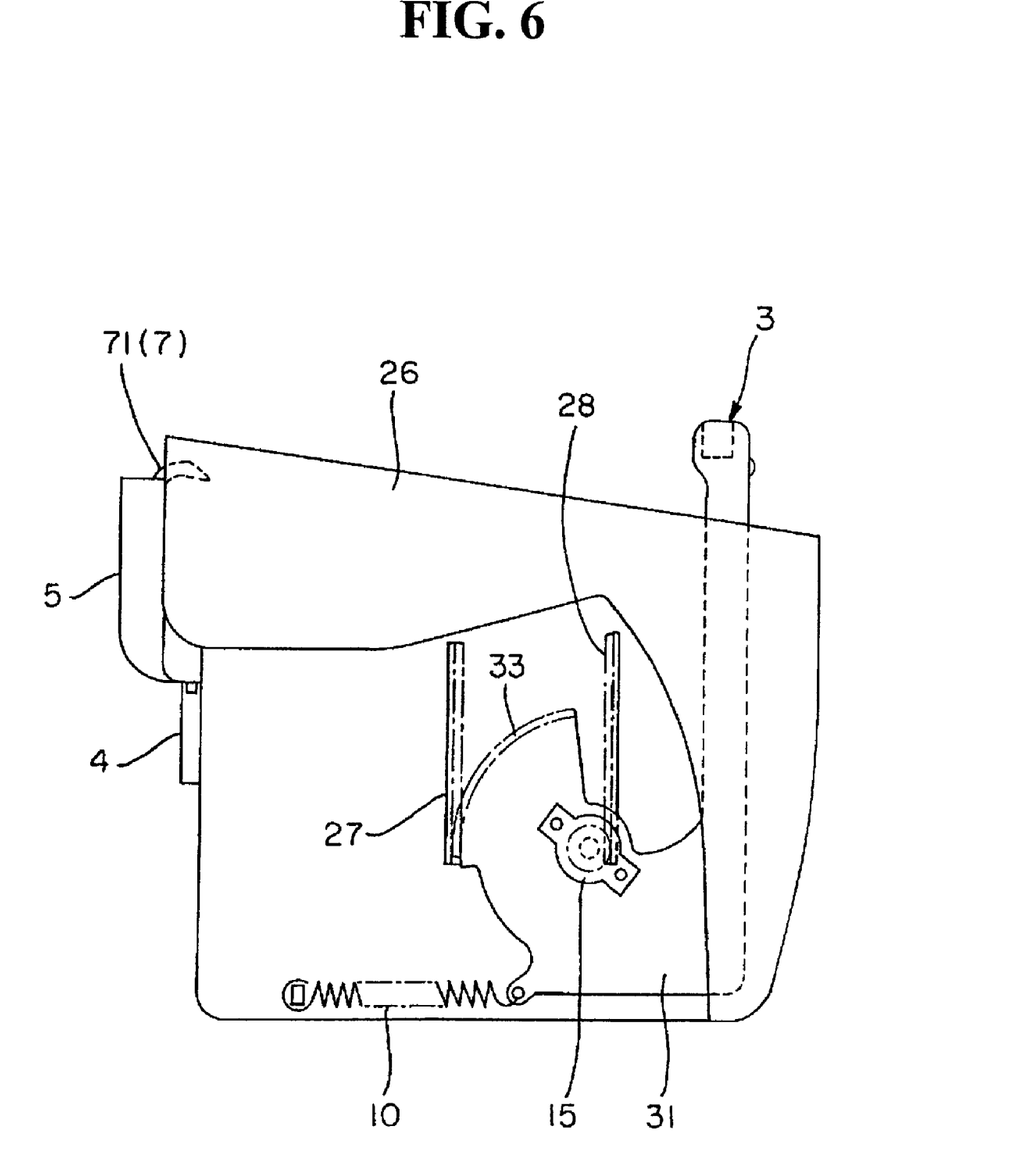
FIG. 6 is a side view showing the box with the door in the open position.

In accordance with the second aspect of the invention, as apparent in at least FIGS. 2(a), 2(b), the shape of the first rack portion and second rack portion allows the volume of an overhung portion from the inside of the base member of the door in the open position to be reduced as compared with the above mentioned conventional arrangement. Also, as apparent from a comparison of FIGS. 2(a), 2(b) and FIG. 10(a), in the conventional mechanism, when the door receives a large downward load in the closed position, a second fixing gear (element 28) bears an excessive load and this may cause damage. However, in the mechanism according to the embodiments of the invention, the arc-like gear portion on the door side and the rotating gear are moved together and the load can be easily absorbed, so that damage or breakage can be prevented.

In accordance with the third aspect of the invention, when the door opening and closing mechanism is integrally molded in the base member, the necessary mold precision can be easily obtained, and the precision of the gear engagement can be improved, so that an excellent operation can be maintained.

In accordance with the fourth aspect of the invention, arrangement and assembly of the rotating gear constituting the rotational mechanism can be simplified with respect to the braking function of the damper means.

The fifth aspect of the invention involves the latch mechanism of the door opening and closing device. For example, as compared to the conventional mechanism of the Japanese Patent Publication No. 2003-129742, a projection-like engagement member or engagement portion which engages and disengages the latch mechanism is not required to be provided on the door or lid and as such the appearance and usability in such a case when an article is placed in or removed from the base member can be improved.

In accordance with the sixth aspect of the invention, the push-push locking mechanism, i.e., wherein both locking and unlocking can be achieved by the pushing the door, is such that the door opening and closing mechanism exhibits an excellent operational performance. Also, since an unlocking lever member and the like, is not required, the device is simplified.

In accordance with the seventh aspect of the invention, the latch device, slider, and latching member can be assembled to the base member as a pre-assembled unit.

DETAILED DESCRIPTION OF PREFERRED EMBODIMENTS

Hereinafter, preferred embodiments of the present invention are explained with reference to the embodiments of figures. At this time, however, it should be noted that, FIGS. 1 to 4 show a box construction wherein a door opening and closing device is applied, and FIGS. 5 to 9(b) show operation of the associated parts. The following explanation is detailed in the order corresponding to overall summary, structure of essential parts, assembly, and operation.

SUMMARY

A box 1 of the illustrated embodiment includes a box-like base member 2 with a superior opening. This opening is opened and closed by a door 3 wherein a rotational mechanism and latch mechanism according to embodiments of the present invention are applied. The box 1 can be mounted in (a depression of) an instrument panel inside a vehicle or in (a depression of) a center console of the vehicle and arranged to extend in the fore-and-aft direction of the vehicle. However, in an embodiment of the door opening and closing device of an object, the door 3 may be switched between an open position and a closed position relative to the base member 2 through a rotational mechanism, and locked to be unlockable at the closed position through the latch mechanism of the invention.

However, there is no special limit on an application and use of the disclosed arrangements. For example, the base member 2 only needs to include the opening corresponding to the door 3 or an operational face such as an operating panel which is equivalent to the opening (here, this kind of embodiment is also referred to the opening for convenience), and is designed according to the embodiment of an applied product. Therefore, the door 3 is also not limited to the one being arranged in a roughly horizontal direction when in a closed position and in an essentially vertical direction at the open position as shown in the embodiment. For example, the base member may be open at the front side or back side, and the door 3 may be arranged in an essentially top-to-bottom direction in the closed position and in an essentially horizontal direction in the open position. Rotational mechanisms of the door are provided on both sides of the base member 2 and arms 31 corresponding to the door 3, and the latch mechanism is provided on the front side of the base member 2.

(Base Member)

The base member 2 of the embodiment is made of resin molding materials, and has a container shape whose upper part is open. An interior 21 is separated into right-and-left compartments 21a, 21b via a partition wall 22 which is located between the two halves of the interior 21 and extended partially into the interior from the front side of the interior 21. Both side walls 23 have step portions in such a way that front sides 23a sink one step toward the inside 21 relative to back sides 23b, and form window portions 24 which are elongate and cut out vertically along end faces of the step portions.

A front wall 25 forms an outside crevice or recess 25a provided approximately between the two halves of the front wall 25 and corresponding to the partition wall 22. The upper circumference of the base member 2 is rimmed with a short flange portion 26 overhung one step in such a way that the door 3 can be fitted into the base member 2 in the closed position. Therefore, in the interior 21, the depressions 21a, 21b are communicated to each other at the back side of the partition wall 22, and the door 3 can be generally fitted in a state wherein the door 3 is stood at the back side of a communicating portion, i.e., at the open position of the door. Incidentally, the box 1 can be a so called "cup holder" for both holder and storage retaining a container such as a bottle for beverage use and so on in the depressions 21a, 21b. For example, the container is fitted in a depressed place on an installation portion side in a state wherein the lower side below the flange portion 26 is encased.

In more detail, the front surfaces 23a of both side walls 23, first rack portions 27 and second rack portions 28 which are arranged roughly in parallel, are integrated respectively. Respective rack portions 27, 28 are extended in a depth direction inside the base member 2, i.e., above and below on the side walls of the base member 2. Respective gear portions 27a, 28a face each other and disposed at a predetermined distance from one another. Incidentally, in this embodiment, both the rack portions 27, 28 (gear portions 27a, 28a) are linearly arranged—viz., are straight. However; for example, the upper side or lower side of the rack portions 27, 28 (gear portions 27a, 28a) may be curved. Projections 29 are integrally formed and project out on the front lower side of the front wall 23a. These projections 29 are used to secured one end 10a of springs 10. Also, in the partition wall 22, a through hole 22a is penetrated above and below in front of the flange portion 26.

More specifically, in this example, the front side of the partition wall 22 is located on the crevice 25a. In the partition wall 22, mounting legs 22b are provided in pairs on the undersurface of the wall on the front side. Each leg 22b is formed in a screw hole whose lower part is open. Also, a cutout portion 26a is provided between the two halves of the front side of the flange portion 26. The cutout portion 26a comprises hole leading the tip of a latching member 7 described hereinafter, from the outside of the base member to the inside of the base member.

In the latch mechanism in the illustrated embodiment, a slider 6 and the latching member 7 are assembled with a case 5 together with the latch mechanism 4 to form a unit. Here, as shown in FIGS. 1, 2(a), 2(b), 7(a), 7(b), the inside of the case 5 is divided by a main case portion 50 and a sub-case portion 51 which is integrally formed at the front of the main case portion. The whole length of the main case portion 50 is shorter than that of the sub-case portion 51 for only the length such that the upper side of the main case portion 50 is slightly lowered. Also, the opening of the bottom face of the main case portion 50 is smaller than that of the upper side of the main case portion 50, so that the latch mechanism 4 can be inserted from the lower opening and attached. Flanges 52 project horizontally from both side faces. These flanges 52 are mounted by screws 11 (see FIG. 1) and are positioned relative to the legs 22b of the base member. This mounting operation starts from the state wherein the latch mechanism 4, slider 6, and latching member 7 are respectively assembled with the main case portion 50 of the case 5. The sub-case portion 51 of the case 5 includes shaft holes 53 provided on the upper side of both inner sides of the sub-case portion 51 and pivoting the latching member 7. Also, the sub-case portion 51 pivotally supports the latching member 7 and forms a space for allowing the rotation or pivoting thereof.

The latch mechanism 4 is, in this particular embodiment, essentially the same as, for example, a conventional push-push locking mechanism, i.e., when the door 3 is rotated in the closed position against urging forces of the urging springs 10, the latch mechanism 4 is locked, and when the door 3 is pushed further in the same direction and released from one's grasp, the latch mechanism 4 is unlocked. Also, the latch mechanism 4 includes an impact release protecting function.

More specifically, as shown in FIGS. 7(a), 7(b), the latch mechanism 4 comprises a case 40; a latch member 42 arranged in the case 40 to be movable up and down therein; an elastic locking portion 43 provided in the latch member 42; a heart-shaped cam groove 45; a pin 44 tracing along the cam groove 45; a plate spring 47 biasing the pin 44; a responding moving member 46 arranged directly below the latch member 42; a spring member 48 biasing the latch member 42 upward; and a spring member 49 biasing the responding moving member 46 upward.

Among these, the case 40 includes a large diameter portion provided in the upper part of a tube shape and is latched to the inside of the lower opening of the case 5. Mounting claws 40a are provided on the upper side of both side faces and locking in the bottom face of the case 5 (main case portion 50); and an inside spring bearing 41.

The latch member 42 includes the cam groove 45 on the front side; the elastic locking portion 43 arranged at the top, dividing a roughly U-shaped portion between the front side and back side, and using the back side portion of the U-shaped portion; and a hollow portion provided on the underside of the U-shaped portion and arranging the upper side of the spring member 48.

Also, in FIG. 7(b), the cam groove 45 comprises a guidance groove 45a extending to the upper left side from the under side; a locking guidance groove 45b and an unlocking guidance groove 45d which are located on the upper side of the guidance groove 45a and part right and left; a locking groove 45c located on the underside between the guidance grooves 45b, 45d; and a return groove 45e extending downward from the guidance groove 45d.

The locking portion 43 includes a claw provided on the upper end of an elastic piece, and when the latch member 42 is pushed downward by the slider 6 against the spring member 48, the latch member 42 moves in the same direction inside the case 40. By this movement, the tip of the claw is elastically displaced in a direction wherein the U-shaped portion is narrowed and retains a claw or pawl 65 on a slider 6 side.

Incidentally, the responding moving member 46 and the spring member 49 can be omitted if so desired.

In an impact release protecting structure, the responding moving member 46 is pivoted to be pivotal through only a predetermined angle about an axis 46a on the lower side of the inside of the case 40. The responding moving member 46 includes a projecting receiving portion 46b projected on the upper side and catching a corresponding portion of the latch member 42. When a latch device 4 receives a large load such as an impact and so on in a locked state in FIGS. 7(a), 7(b), the responding moving member 46 is rotated in one direction (in this example, counterclockwise) against an urging force of the spring member 49. Herewith, the projecting receiving portion 46b of the responding moving member 46 abuts against a lower corresponding portion of the latch member 42, and this abutment stops a downward movement of the latch member 42, so that the latch mechanism 4 prevents the tip of the pin 44 from improperly sliding to the unlocking guidance groove 45d, i.e., an unlocked position from the locking groove 45c.

The slider 6 comprises a lower frame portion 60 fitted into the main case portion 50 to be freely slidable up and down; and a upper frame portion 61 projecting in a state wherein the upper frame portion 61 is connected to both sides of the lower frame portion 60. The upper and lower frame portions continuously open front sides. The lower frame portion 60 includes control claws 63 provided on both outer side faces and preventing from improperly slipping from a state wherein the control claws 63 are arranged in the main case portion 50; guiding grooves 64 provided on both inner side faces and facing each other; engaged portions 65 projecting on the undersurfaces of the frames; and claws 65a provided in the tip of the engaged portions 65 and engaged and disengaged the latch device 4. Correspondingly, the upper frame portion 61 is sized to be able to pass through the through hole 22a of the base member to be freely slidable up and down, and the upper surface of the upper frame portion 61 is pressed at the corresponding portion of the door 3.

The latching member 7 has a chevron/inverted hook-like shape and comprises a lower portion 70 which is on a base end side and an upper portion 71 which is on the tip side. The lower portion 70 includes shaft portions 73 projected on both lower sides, and the upper portion 71 includes shaft portions 74 projected on both lower sides (slightly above the intermediate part of the chevron shape). Also, the upper portion 71 has a thickness selected of being able to be freely inserted into the cutout portion 26a (inside from the outside of the base member) of the base member. For example, the latching member 7 is inserted into the case 5 with the slider 6 from the state wherein the shaft portions 73 on both sides are fitted into the corresponding guiding grooves 64 on a slider side. Also, the shaft portions 74 on both sides are fitted into the corresponding shaft holes 53 of the sub-case portion 51 and pivoted. Herewith, the latching member 7 and the slider 6 are operationally connected through fitting between the guiding grooves 64 and shaft portions 73. For example, as shown in FIGS. 8(a), 8(b), when the slider 6 is pressed downward by the door 3 at a most elevated position, the latching member 7 is interlocked with a downward movement of the slider 6 and rotated clockwise about the shaft portions 74 which acts as fulcrum. Herewith, as shown in FIGS. 7(a), 7(b), the door 3 can be locked.

(Door)

The door 3 of the embodiment is the size of roughly closing the opening of the base member 2 and has a flat plate shape. The door 3 includes the supporting arms 31 arranged downward on both back sides; roughly arc-like portions 32 provided at tips of the arms 31; arc-like or sector gear portions 33 provided on peripheries of the arc-like portions 32; a depression 34 as an engaged portion provided in between the two halves of the end face of the front side or free end; and a guiding rib 30a provided in between the two halves of the upper face of the front side or free end. The arc-like portion 32 of each arm 31 can project to the outside, i.e., the front side 23a of each side wall 23 from the inside 21 of the base member with enough room through the corresponding window portion 24. The shaft portion 35 is provided on the underside of the arm 31 and latches the other end 10b of each urging spring 10. Respective damper means 15 is added roughly at the center of the arc-like portion 32.

More specifically, each arc-like gear portion 33 is a concentric gear of the arc of the arc-like portion 32, and engages the gear portion 27a of each first rack portion 27. Also, in the process that the door 3 is rotated from the closed position to the open position or from the open position to the closed position, the arc-like gear portion 33 can move downward or upward along the track of the gear portion 27a.

At the center of each the arc-like portion 32, a respective mounting hole 36 is formed. A pair of fixed steps are provided on the outer surface of each mounting hole 36. Each damper means 15 is fixed by screws 12 and so on in a state wherein a respective main member 16 is inserted and retained in the mounting hole 36 and the fixed steps. The damper means 15 comprises a well-known rotary oil damper or the liked, and includes a rotating gear 18 mounted in an output shaft 17 (refer to FIG. 5) which meets with resistance of operating oil. In a mounted state, the rotating gear 18 is projected to the inside of the mounting hole 36, and engages the gear portion 28a of the respective second rack portion 28. Incidentally, the damper means 15 may be an air damper as long as the air damper is of a rotary type.

(Assembly)

An example of the procedure when the door 3 is assembled with the base member 2 will now be explained. First, one end 10b of each spring 10 is connected to the respective shaft portion 35, so that the urging spring 10 is attached to the respective arm 31. Next, after both arms 31 of the door 3 are entered into the interior 21 of the base member 2 and projected to both outer sides of the base member via the corresponding window portions 24. The respective arc-like gear portions 33 are engaged with the gear portions 27a of the first rack portions 27, and the rotating gears 18 of the damper means 15 are engaged with the gear portion 28a of the second rack portion 28.

Herewith, the door 3 is assembled with the base member 2, and supported to be rotatable through each engagement between the gear portion 33 and gear portion 27a, and between the rotating gear 18 and the gear portion 28a. Next, when the spring 10 is connected to the respective projection 29 while pulling the one end 10a, the urging spring 10 provides an urging or biasing force which acts to move the door toward its open position, and switches the door 3 to the open position by the urging force. Therefore, in this rotational mechanism, members except for the base member 2 and the door 3 are two members of the urging springs 10 and the damper means 15. Also, since the first rack portion 27 and the second rack portion 28 are essentially linear, the molding on a base member side can be substantially simplified compared to a conventional mechanism in FIGS. 10(a), 10(b). Also, the precision of the engagement between teeth after the molding can be improved. Incidentally, in FIGS. 1, and 2(b), numeral 2a represents a positional control projection. The projection 2a slidably supports the end face of the arc-like portion 32. Herewith, the projection 2a controls the position so that the door 3 does not move in a horizontal direction. Also, the above-mentioned damper means 15 may be omitted by providing a spur gear in the center of the arc-like portion 32 to be freely rotatable as an alternative to the rotating gear 18.

(Operation)

Figure 7:
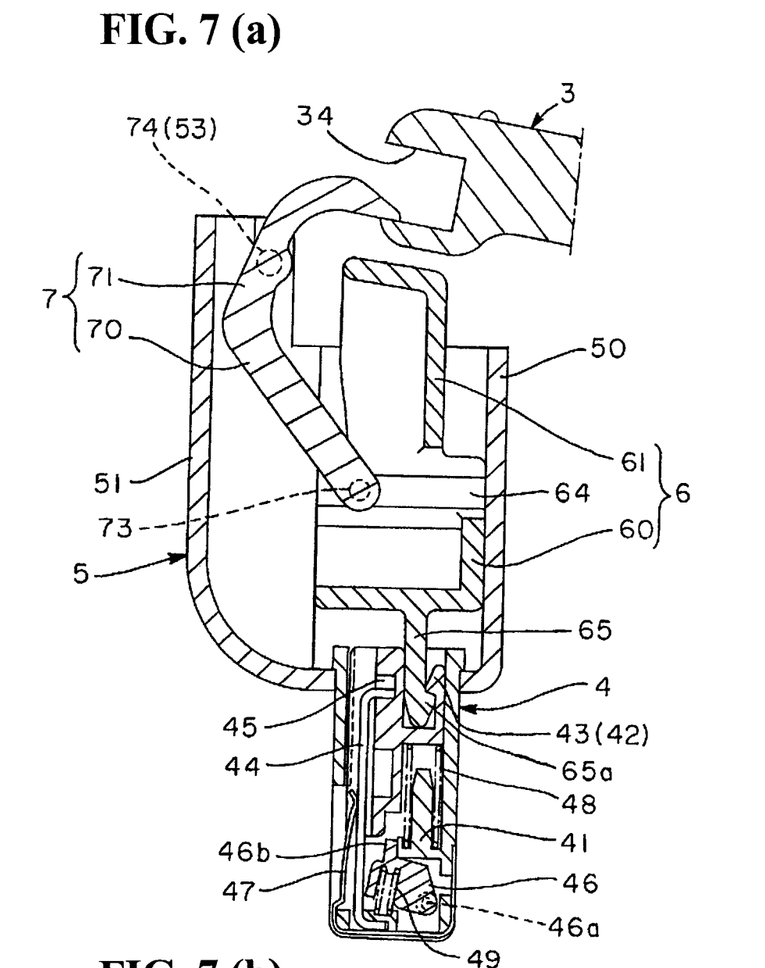
FIG. 7(a) shows a cross-sectional view along the line 7(a)-7(a) in FIG. 4 in which the position parts of a latch mechanism of the door are in the position shown in FIG. 5.
FIG. 7(b) shows an enlarged sectional view showing the position of the pin.
Figure 8:
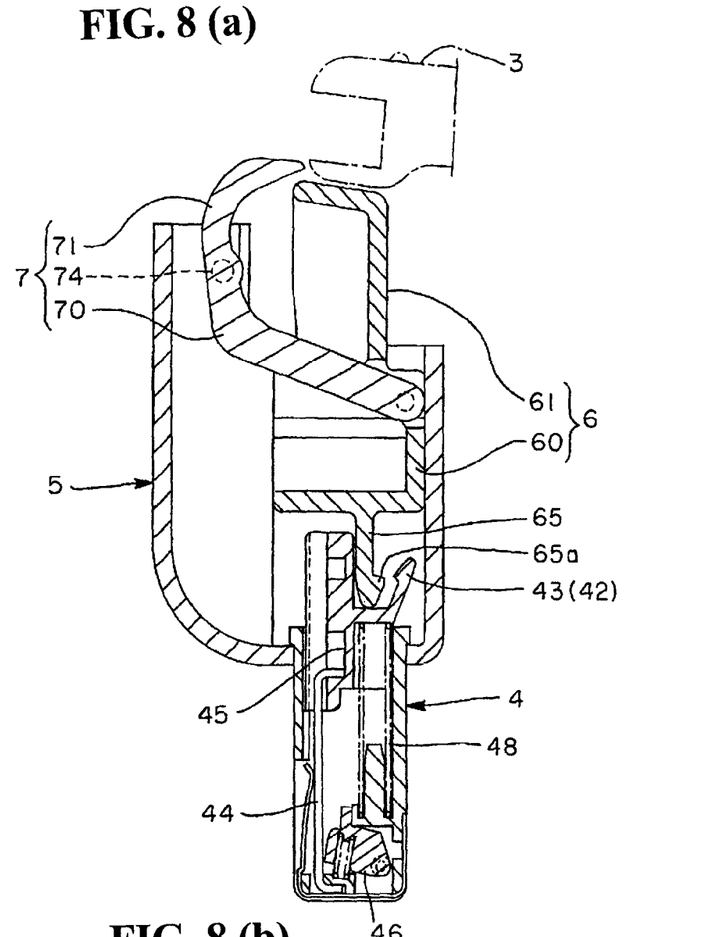
FIG. 8(a) shows a cross-sectional view along the line 7(a)-7(a) in FIG. 4 in which the positions parts of the latch mechanism of the door are in the position shown in FIG. 6.
FIG. 8(b) shows an enlarged sectional view showing the position of the pin.
Figure 9:
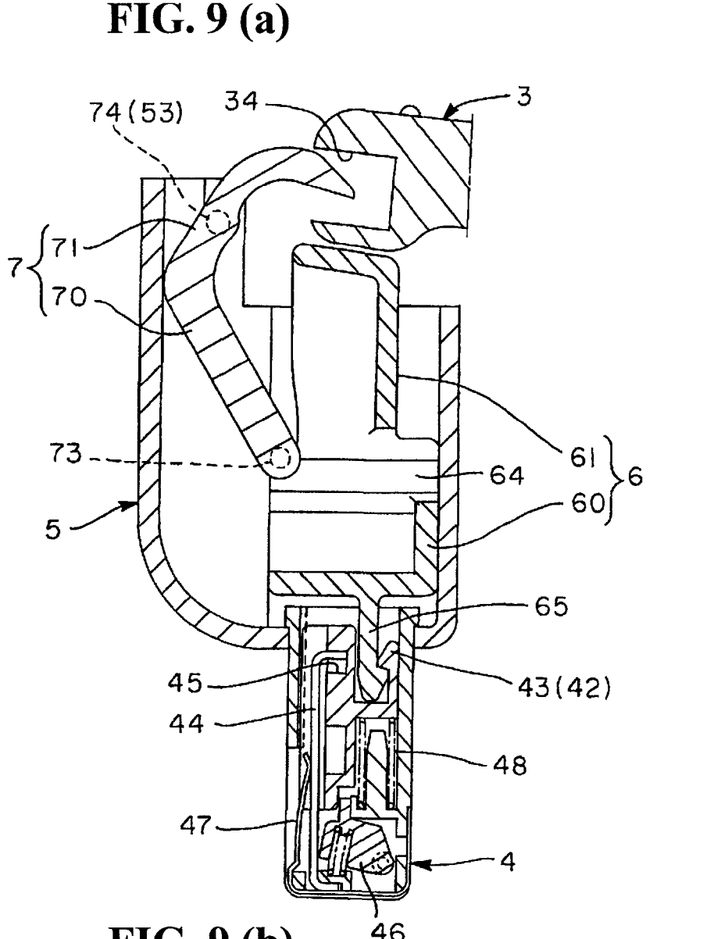
FIG. 9(a) shows a cross-sectional view along the line 7(a)-7(a) in FIG. 4 in which the positions parts of the latch mechanism are unlocked from the state shown in FIG. 5.
FIG. 9(b) shows an enlarged sectional view showing the position of the pin.

Next, the rotational mechanism of the door 3 and the operation of the latch mechanism will be explained with reference to FIGS. 2(a), 2(b), 7(a)–9(b). FIGS. 7(a)–9(b), FIGS. 7(a), 8(a), 9(a) show a relationship between the latch mechanism and the door 3, and FIGS. 7(b), 8(b), 9(b) show frame formats of a relationship between the cam groove 45 and the pin 44 of the latch device 4.

FIGS. 2(a), 7(a), 7(b) show the closed position wherein the door 3 completely closes the opening of the base member 2. In this closed position, as the rotational mechanism, the arc-like gear portion 33 of the door 3 engages the gear portion 27a of the first rack portion 27, and the rotating gear 18 engages the gear portion 28a of the second rack portion 28. In this state, the door 3 is retained more stably by each engagement between the gear portion 33 and the first rack portion 27, and between the rotating gear 18 and the second rack portion 28.

The latch mechanism fixes the position of the door 3 against an urging force of the urging spring 10 through the latch mechanism 4, the slider 6, and the latching member 7. More specifically, the door 3 is rotated in the closed direction against the urging force of the urging spring 10 from the open position in FIG. 2(b). However, just before the door 3 reaches the final closed position, the undersurface of the free end of the door 3 abuts against the upper frame portion 61 of the slider 6 as shown in FIGS. 8(a), 8(b). As a result, the slider 6 is pushed by the door 3 and slid downward. At the same time, the latching member 7 is interlocked with the downward movement of the slider 6 and rotated clockwise as the fulcrum of the shaft portion 74 (at this point, the shaft portions 73 move forward along the guiding grooves 64). Due to this rotation, a tip 71 of the latching member engages in depression 34 of the door 3. In the relationship to the latch mechanism 4, when the slider 6 is moved downward by a pressing force of the door 3 from the position of the slider 6 in FIGS. 8(a), 8(b), the engaged portion 65 underneath the slider pushes the latch member 42 downward against an urging force of the spring member 48 as shown in FIGS. 7(a), 7(b). At the same time, the tip of the pin 44 enters into the locking guidance groove 45b from the guidance groove 45a, and when the door 3 is released from one's grip, the tip of the pin 44 is locked in the locking groove 45c. Due to this lock, the door 3 is retained in the closed position.

On the other hand, when the door 3 is switched to the open position, when the door 3 is further pushed in the closed direction from the condition in FIGS. 7(a), 7(b) and released from one's grip, the door 3 is automatically rotated in the open position by an urging force of the urging spring 10 after the latch device 4 is switched to an unlocked condition through the slider 6 and the latching member 7. In other words, since the latch mechanism switches the door 3 to the open position, when the door 3 is re-pushed and released from being re-pushed, the latch member 42 is slightly moved downward through the slider 6 which is moved downward by the door 3 as shown in FIGS. 9(a), 9(b), 8(a), 8(b). As a result, the tip of the pin 44 re-returns to the guidance groove 45a through the unlocking guidance groove 45d and the return groove 45e from the locking groove 45c. At the same time, the latch member 42 is also raised by an urging force of the spring member 48 and switched to the unlocked state in FIGS. 8(a), 8(b).

For the rotational mechanism, the arc-like gear portion 33 engages the gear portion 27a of the first rack portion 27, and the arc-like portion 32 moves downward from the upper side tooth of each rack portion 27, 28 to the lower side tooth of the rack portion 27, 28 while the rotating gear 18 engages the gear portion 28a of the second rack portion 28. More specifically, in the rotational mechanism, the arc-like gear portion 33 rotates along the first rack portion 27, and the rotating gear 18 rotates by engaging the second rack portion 28, so that the door 3 is switched to rotate in the open position with the downward movement. The speed of the switching is reduced by the engagement of the teeth, and the switching is also braked by the damper means 15. Thus, the door 3 is always moved at essentially a constant speed from the closed position of the door 3 as shown in FIG. 2(a) to the open position as shown in FIG. 2(b). In the open position, the door 3 significantly reduces the overhung portion from the inside of the base member 2 by the downward movement along the first and second rack portions 27, 28 arranged in the top-to-bottom direction, and the appearance is also improved.

In the case wherein the door 3 is moved to the closed position again, the overhung portion of the door 3 is pulled against the urging force of the urging spring 10. With this, the arc-like gear portion 33 moves upward from the lower side tooth to the upper side tooth while the arc-like gear portion 33 engages the gear portion 27a of the first rack portion 27. At the same time, the rotating gear 18 rotates, i.e., interlocks with the arc-like portion 33 and moves upward from the lower side tooth to the upper side tooth of the second rack portion 28 while the rotating gear 18 engages the gear portion 28a of the second rack portion 28. Just before the closed position of the door 3, the latch device 4 is switched to the locked condition through the slider 6 and the latching member 7 as explained in the above.

Incidentally, the present invention only needs to include technology/components specified in connection with the above mentioned first to fourth aspect of the invention, and structural details of the invention can be variously modified according to need.

The disclosure of Japanese Patent Application No. 2005-184710 filed on Jun. 24, 2005 is incorporated herein as a reference.

While the invention has been explained with reference to the specific embodiments of the invention, the explanation is illustrative and the invention is limited only by the appended claims.

What is claimed is:

1. A door opening and closing device having a rotational mechanism configured to switch a door between a closed position and an open position relative to a base member, comprising:

latch means for latching the door in the closed position on the base member, the latch means including:
   a first case attached to the base member,
   a latch device vertically slidably disposed in the first case and having an elastic locking portion;
   a second case disposed above the first case;
   a slider slidably situated in the second case above the latch device; and
   a latching member pivotally supported by the second case and including a base end slidably connected with the slider, and a tip configured to engage a portion of the door,
   wherein when the door is moved to the closed position, the slider is moved by the door and is engaged with the latch device while the latching member is pivoted to engage the door.

2. A door opening and closing device according to claim 1, further comprising urging means for urging the door in the open direction, wherein said latch device is a push-push latching mechanism in which when the door is pushed in a condition that the latch device engages the door, the latch device is moved through the slider and is released.

3. A door opening and closing device according to claim 2, wherein the push-push latching mechanism is attached to the first case.

4. A door opening and closing device according to claim 1, wherein said second case is formed separately from the latch device and is attached to the base member so that the latch device is attached to the base member through the second case.

5. A door opening and closing device having a rotational mechanism configured to switch a door between a closed position and an open position relative to a base member, comprising:

latch means for latching the door in the closed position on the base member, the latch means including:
   a first case attached to the base member,
   a latch device vertically slidably disposed in the first case and having an elastic locking portion;
   a second case disposed above the first case;
   a slider slidably situated in the second case above the latch device; and
   a latching member pivotally supported by the second case and including a base end slidably connected with the slider, and a tip configured to engage a portion of the door,
   wherein when the door is moved to the closed position, the slider is moved by the door and is engaged with the latch device while the latching member is pivoted to engage the door,
   wherein said second case is formed separately from the latch device and is attached to the base member so that the latch device is attached to the base member through the case, and,
   wherein said slider includes an engaged portion projecting downwardly therefrom to engage with and disengage from the elastic locking portion of the latch device.

* * * * *